United States Patent
Bang et al.

(10) Patent No.: US 9,874,778 B2
(45) Date of Patent: Jan. 23, 2018

(54) COLOR FILTER SUBSTRATE, MANUFACTURING METHOD THEREOF, AND LIQUID CRYSTAL DISPLAY INCLUDING THE SAME

(71) Applicant: Samsung Display Co., Ltd., Yongin-si (KR)

(72) Inventors: Jungsuk Bang, Yongin-si (KR); Sunhwa Lee, Yongin-si (KR); Sanguk Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 76 days.

(21) Appl. No.: 14/965,424

(22) Filed: Dec. 10, 2015

(65) Prior Publication Data

US 2016/0357061 A1 Dec. 8, 2016

(30) Foreign Application Priority Data

Jun. 2, 2015 (KR) .................... 10-2015-0078251

(51) Int. Cl.
*G02F 1/1335* (2006.01)
*G02B 5/20* (2006.01)
(Continued)

(52) U.S. Cl.
CPC ....... *G02F 1/133514* (2013.01); *G02B 5/201* (2013.01); *G02F 1/133512* (2013.01);
(Continued)

(58) Field of Classification Search
CPC ... G02F 1/133514; G02F 2001/136222; G02F 2201/52; G02F 1/136209; G02F 1/133512;
(Continued)

(56) References Cited

U.S. PATENT DOCUMENTS 7,212,262 B2 * 5/2007 Kang ................ G02F 1/133514
349/106
7,764,347 B2 * 7/2010 Park ...................... G02F 1/1333
349/106

(Continued)

FOREIGN PATENT DOCUMENTS

| KR | 10-2006-0044263 | 5/2006 |
| KR | 10-2008-0111939 | 12/2008 |
| KR | 10-2012-0066323 | 6/2012 |

*Primary Examiner* — Jia Pan
(74) *Attorney, Agent, or Firm* — H.C. Park & Associates, PLC

(57) ABSTRACT

A color filter substrate includes: a first substrate including a first sub-pixel region corresponding to a non-white color region and a second sub-pixel region corresponding to a white color region and adjacent to the first sub-pixel region; a light-blocking pattern disposed on the first substrate, the light-blocking pattern including a first opening corresponding to the first sub-pixel region and a second opening corresponding to the second sub-pixel region; a first color filter having a first color and disposed in the first sub-pixel region; and a transparent layer disposed in the second sub-pixel region and on the first color filter. The light-blocking pattern further includes a disconnected portion between the first sub-pixel region and the second sub-pixel region, and the first and second openings are coupled to each other via the disconnected portion.

20 Claims, 10 Drawing Sheets

(51) Int. Cl.
*G02F 1/1343* (2006.01)
*G02F 1/1333* (2006.01)

(52) U.S. Cl.
CPC ............ *G02F 1/134363* (2013.01); *G02F 2001/133357* (2013.01); *G02F 2201/52* (2013.01)

(58) Field of Classification Search
CPC .. G02F 1/134363; G02F 2001/133357; G09G 3/2003; G09G 2300/0452; G09G 3/3607; G09G 3/3611; G09G 5/02; G02B 5/201; H01L 27/322; H01L 27/3213
See application file for complete search history.

(56) References Cited

U.S. PATENT DOCUMENTS

| | | | | |
|---|---|---|---|---|
| 8,896,790 | B2* | 11/2014 | Shim | G02F 1/133516 349/106 |
| 2005/0117092 | A1* | 6/2005 | Park | G02F 1/133514 349/106 |
| 2006/0097414 | A1* | 5/2006 | Chae | G02B 5/22 264/1.27 |
| 2008/0316398 | A1 | 12/2008 | Woo et al. | |
| 2011/0234949 | A1* | 9/2011 | Matsui | G02F 1/133512 349/106 |
| 2012/0268700 | A1* | 10/2012 | Shu | G03F 7/0007 349/106 |
| 2014/0111749 | A1* | 4/2014 | Won | G02F 1/136209 349/110 |

* cited by examiner

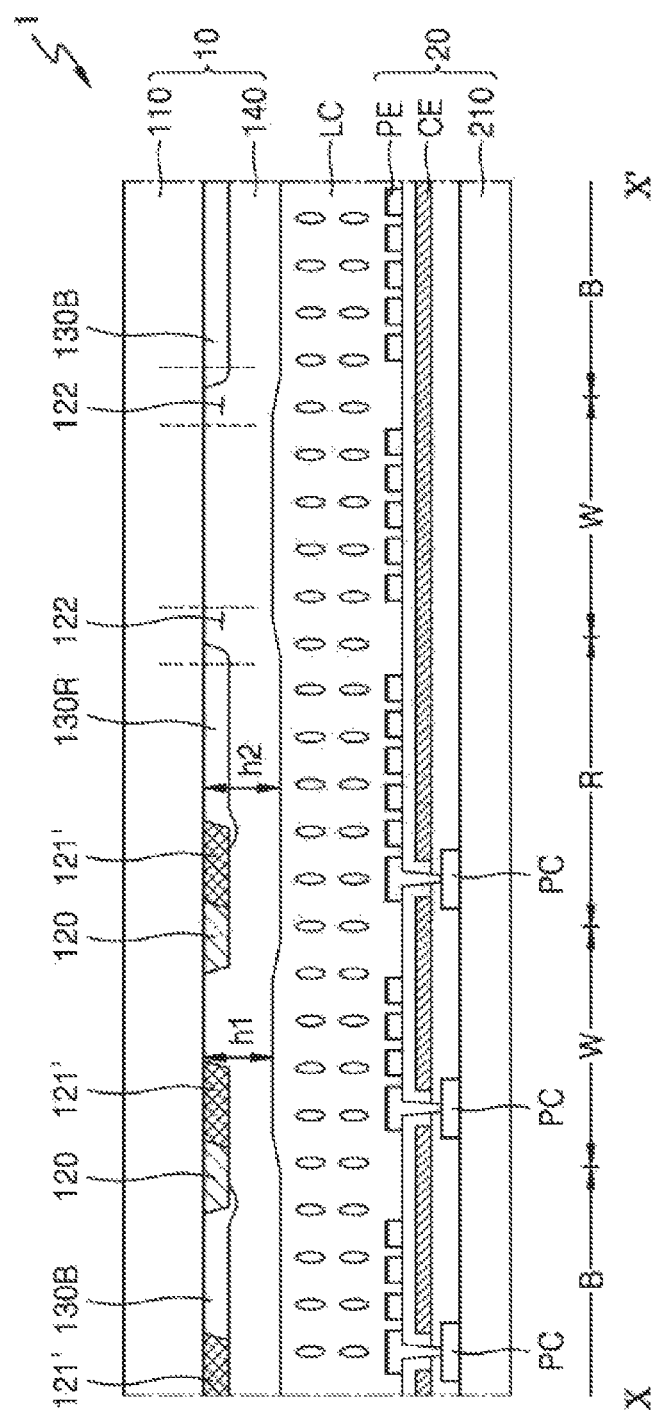

COLOR FILTER SUBSTRATE, MANUFACTURING METHOD THEREOF, AND LIQUID CRYSTAL DISPLAY INCLUDING THE SAME

CROSS-REFERENCE TO RELATED APPLICATION

This application claims priority from and the benefit of Korean Patent Application No. 10-2015-0078251, filed on Jun. 2, 2015, which is hereby incorporated by reference for all purposes as if fully set forth herein.

BACKGROUND

Field

Exemplary embodiments relate to a color filter substrate, a method of manufacturing the color filter substrate, and a liquid crystal display including the color filter substrate.

Discussion of the Background

Demand for flat displays has increased along with the development of various electronic devices, such as cellular phones, personal digital assistants (PDAs), computers, and large TVs. Liquid crystal displays (LCDs) developed as flat displays have characteristics, such as low power consumption, mechanisms for easily displaying moving pictures, and a high degree of contrast.

LCDs include a liquid crystal layer disposed between two substrates, and if an electric field is applied to the liquid crystal layer, the arrangement of liquid crystal molecules in the liquid crystal layer changes, and thus, polarized light incident on the liquid crystal layer can be controlled. In this manner, the transmission of incident light is allowed or not on the basis of pixels to display images.

The above information disclosed in this Background section is only for enhancement of understanding of the background of the inventive concept, and, therefore, it may contain information that does not form the prior art that is already known to a person of ordinary skill in the art.

SUMMARY

Exemplary embodiments provide a color filter substrate, a method of manufacturing the color filter substrate, and a liquid crystal display including the color filter substrate.

Additional aspects will be set forth in part in the description which follows, and, in part, will be apparent from the disclosure, or may be learned by practice of the inventive concept.

An exemplary embodiment discloses a color filter substrate including: a first substrate including a first sub-pixel region corresponding to a non-white color region and a second sub-pixel region corresponding to a white color region and adjacent to the first sub-pixel region; a light-blocking pattern disposed on the first substrate, the light-blocking pattern including a first opening corresponding to the first sub-pixel region and a second opening corresponding to the second sub-pixel region; a first color filter having a first color and disposed in the first sub-pixel region; and a transparent layer disposed in the second sub-pixel region and on the first color filter. The light-blocking pattern further includes a disconnected portion between the first sub-pixel region and the second sub-pixel region, and the first and second openings are coupled to each other via the disconnected portion.

An exemplary embodiment also discloses a liquid crystal display (LCD) including: a color filter substrate; an opposite substrate which is opposite the color filter substrate; and a liquid crystal layer disposed between the color filter substrate and the opposite substrate. The color filter substrate includes: a first substrate including a first sub-pixel region corresponding to a non-white color region and a second sub-pixel region corresponding to a white color region and adjacent to the first sub-pixel region; a light-blocking pattern disposed on the first substrate, the light-blocking pattern including a first opening corresponding to the first sub-pixel region, a second opening corresponding to the second sub-pixel region, and a disconnected portion between the first sub-pixel region and the second sub-pixel region, the first and second openings are coupled to each other via the disconnected portion; a first color filter having a first color and disposed in the first sub-pixel region; and a transparent layer disposed in the second sub-pixel region and on the first color filter.

An exemplary embodiment further discloses a method of manufacturing a color filter substrate, the method including: forming a light-blocking pattern on a first substrate, the light-blocking pattern including a first opening corresponding to a first sub-pixel region and a second opening corresponding to a second sub-pixel region, the first sub-pixel region corresponding to a non-white color region, the second sub-pixel region corresponding to a white color region and adjacent to the first sub-pixel region; forming a first color filter in the first sub-pixel region, the first color filter having a first color; and forming a transparent layer in the second sub-pixel region and on the first color filter. The light-blocking pattern further includes a disconnected portion between the first sub-pixel region and the second sub-pixel region, and the first and second openings are coupled to each other via the disconnected portion.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept

FIG. 10 is a cross-sectional view taken along section line X-X' of FIG. 9 according to an exemplary embodiment.

DETAILED DESCRIPTION OF THE ILLUSTRATED EMBODIMENTS

Figure 1:
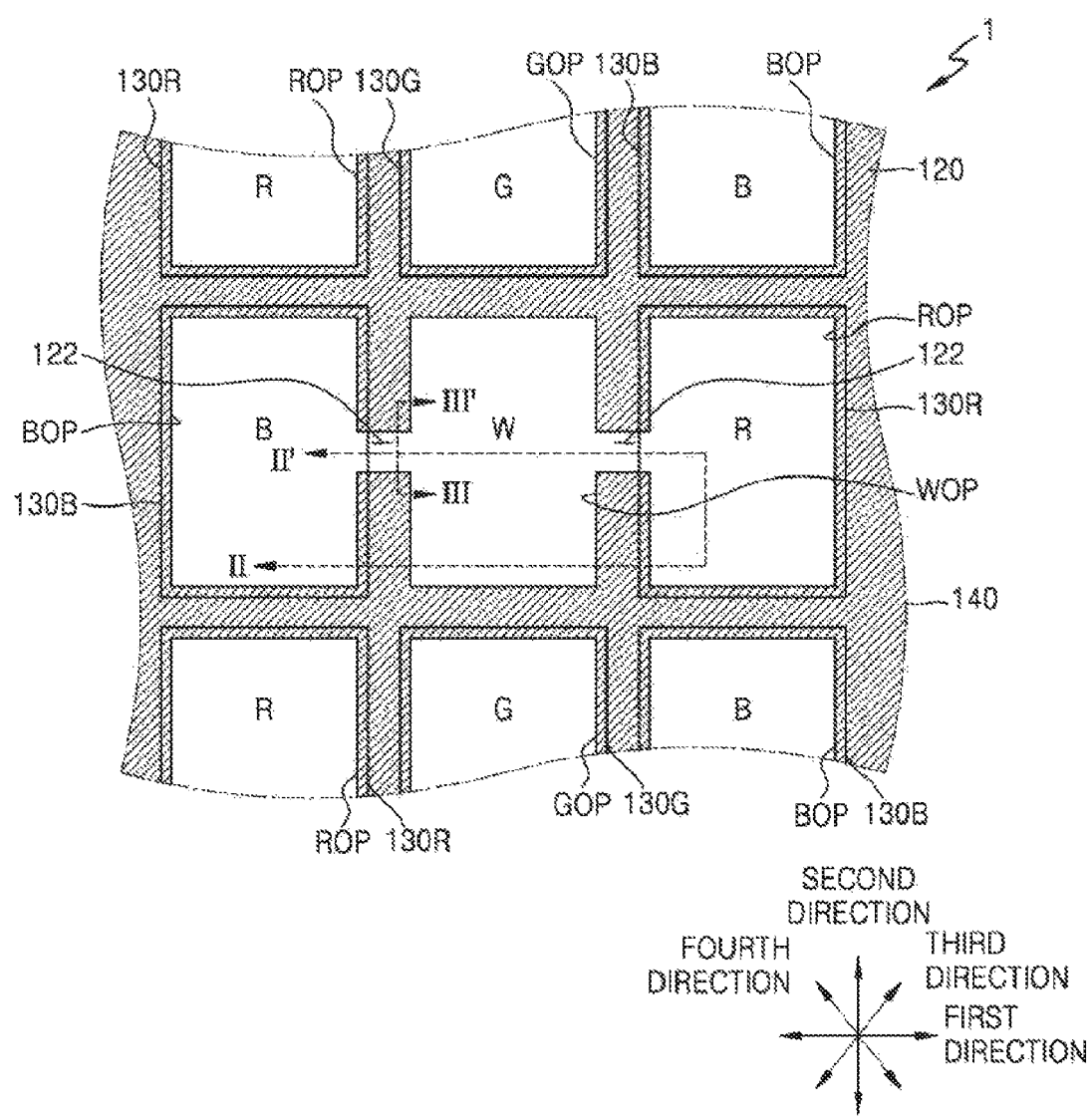
FIG. 1 is a schematic plan view illustrating a liquid crystal display (LCD) according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
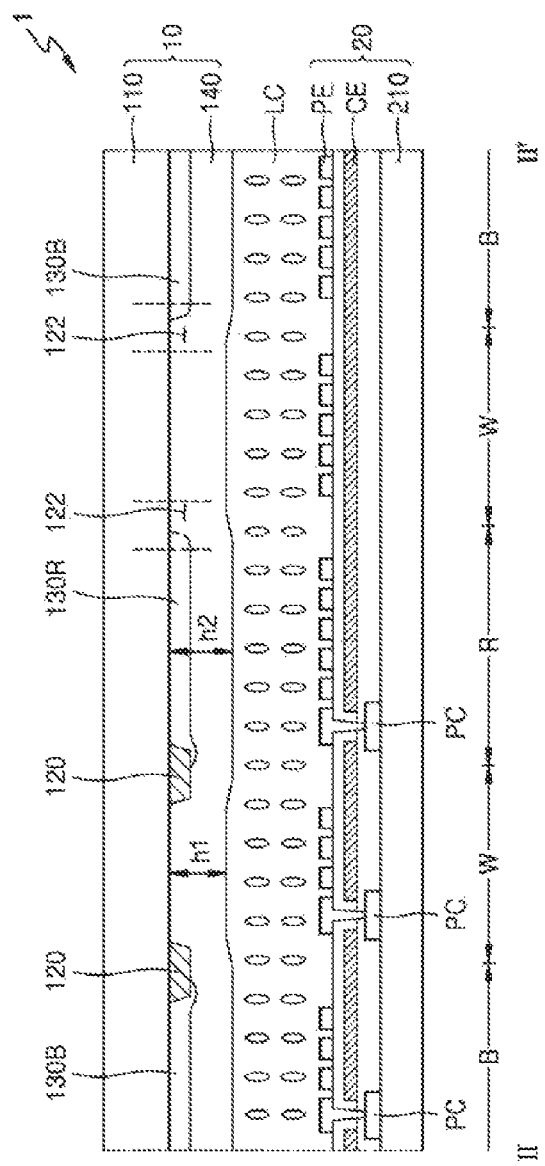
FIG. 2 is a cross-sectional view taken along section line II-II' of FIG. 1 according to an exemplary embodiment.

FIG. 1 is a schematic plan view illustrating a liquid crystal display (LCD) 1 according to an exemplary embodiment. FIG. 2 is a cross-sectional view taken along section line II-II' of FIG. 1 according to an exemplary embodiment, and FIG. 3 is a cross-sectional view taken along section line III-III' of FIG. 1 according to an exemplary embodiment.

Figure 3:
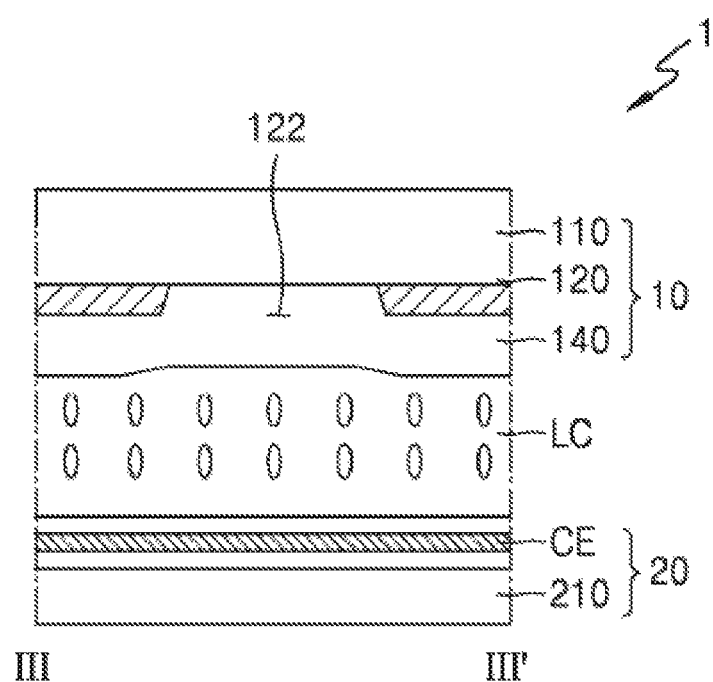
FIG. 3 is a cross-sectional view taken along section line III-III' of FIG. 1 according to an exemplary embodiment.

Referring to FIG. 1, FIG. 2, and FIG. 3, the LCD 1 may include a color filter substrate 10, an opposite substrate 20, which is opposite the color filter substrate 10 and faces the color filter substrate 10, and a liquid crystal layer LC disposed between the color filter substrate 10 and the opposite substrate 20. The LCD 1 may display images according to the following manner: the liquid crystal layer LC controls the polarization direction of white light emitted from a backlight unit (not shown) adjacent to the opposite substrate 20, and then, the light is provided to a user after passing through the color filter substrate 10 so that the user may view color images.

The opposite substrate 20 may include pixel circuits PC, pixel electrodes PE, and a common electrode CE that are disposed on a second substrate 210. Each of the pixel circuits PC may include a thin film transistor as a switching device connected to a gate line (not shown) and a source line (not shown), and the pixel electrodes PE may be electrically connected to the pixel circuits PC with an insulative layer being disposed therebetween. The insulation layer may include a hole through which the pixel electrodes PE are connected to a drain electrode of the thin film transistor. The source line may be connected to a source electrode of the thin film transistor and may receive a data signal from a data pad (not shown). The gate line may be connected to a gate electrode of the thin film transistor and may receive a gate signal from a gate pad (not shown). The pixel electrodes PE may be disposed in sub-pixel regions R, G, B, and W. The common electrode CE and the pixel electrodes PE may form an electric field to control the polarizing direction of liquid crystal molecules in the liquid crystal layer LC. Alignment films (not shown) may be disposed on upper and/or lower sides of the liquid crystal layer LC, and when an electric field is not applied to the liquid crystal layer LC, the alignment films may determine the molecular arrangement of the liquid crystal layer LC.

According to an exemplary embodiment, the common electrode CE and the pixel electrodes PE are formed in the opposite substrate 20. However, the inventive concept is not limited thereto. In other embodiments, electrodes other than the pixel electrodes PE and the common electrode CE may be further formed, and all the electrodes may be disposed only on the color filter substrate 10 or both on the opposite substrate 20 and the color filter substrate 10. Further, one of the pixel electrode PE and the common electrode CE may be formed on the color filter substrate 10 while the other one of the pixel electrode PE and the common electrode CE is formed on the opposite substrate 20. That is, the number and/or arrangement of electrodes may vary depending on the mode of the liquid crystal layer LC.

The color filter substrate 10 may include: a first substrate 110; a light-blocking pattern 120; red, green, and blue color filters 130R, 130G, and 130B; and a transparent layer 140, which are disposed on the first substrate 110. The light-blocking pattern 120 may include openings ROP, GOP, BOP, and WOP corresponding to the sub-pixel regions R, G, B, and W. The light-blocking pattern 120 may be disposed among the sub-pixel regions R, G, B, and W so as to prevent mixing of colors and absorb light incident from the outside to increase the degree of contrast.

The sub-pixel regions R, G, B, and W may include red sub-pixel regions R, green sub-pixel regions G, blue sub-pixel regions B, and white sub-pixel regions W. The white sub-pixel regions W may be adjacent to other sub-pixel regions having colors other than white. For example, the white sub-pixel regions W may be surrounded by the red, green, and blue sub-pixel regions R, G, and B. In this case, the openings ROP, GOP, and BOP corresponding to the red, green, and blue sub-pixel regions R, G, and B may be disposed around the openings WOP corresponding to the white sub-pixel regions W.

The red, green, and blue color filters 130R, 130G, and 130B may be respectively disposed on the openings ROP, GOP, and BOP corresponding to the red, green, and blue sub-pixel regions R, G, and B, and the transparent layer 140 may be disposed on the red, green, and blue color filters 130R, 130G, and 130B. The red, green, and blue color filters 130R, 130G, and 130B may be formed by adding red, green, and blue pigments or dyes to a transparent resin. The red, green, and blue color filters 130R, 130G, and 130B may be larger than the openings ROP, GOP, and BOP, respectively, and end portions of the red, green, and blue color filters 130R, 130G, and 130B may be disposed on an upper surface of the light-blocking pattern 120.

The transparent layer 140 may be disposed on the red, green, and blue color filters 130R, 130G, and 130B and may entirely cover the first substrate 110. For example, the transparent layer 140 may cover the red, green, and blue sub-pixel regions R, G, and B and may also cover the white sub-pixel regions W in which no color filters are disposed. The transparent layer 140 may prevent elution of pigment ions from the red, green, and blue color filters 130R, 130G, and 130B. The transparent layer 140 may be electrically insulative and may include a transparent material such as an acrylic resin or an epoxy-containing resin, or a transparent material such as a photosensitive transparent resin.

The openings ROP, GOP, and BOP (hereinafter referred to as first openings ROP, GOP, and BOP) corresponding to the red, green, and blue sub-pixel regions R, G, and B, respectively, are provided with the red, green, and blue color filters 130R, 130G, and 130B, respectively. However, the openings WOP (hereinafter referred to as second openings WOP) corresponding to the white sub-pixel regions W are not provided with color filters. Thus, the second openings WOP may be filled with portions of the transparent layer 140. In other words, the portions of the transparent layer 140 may be provided as white color filters. In a comparative example, if portions of the transparent layer 140 are filled in the second openings WOP, the height of the transparent layer 140 may be relatively low at the second openings WOP, and thus the upper surface of the transparent layer 140 may not be flat. In this case, a gap (cell gap) between the color filter substrate 10 and the opposite substrate 20 may not be uniform, and thus the quality of images may deteriorate.

However, according to an exemplary embodiment, the light-blocking pattern 120 includes disconnected portions 122, and the first openings ROP, GOP, or BOP and the second openings WOP adjacent to the first openings ROP, GOP, or BOP are coupled via the disconnected portions 122. Therefore, the flatness of the upper surface of the transparent layer 140 may be improved, and the cell gap may be relatively uniform. For example, when the transparent layer 140 is formed on the first substrate 110, a material applied to the red, green, and blue sub-pixel regions R, G, and B for forming the transparent layer 140 may flow to the second openings WOP through the disconnected portions 122. Therefore, the difference between a height h1 of the upper surface of the transparent layer 140 at the second opening WOP (that is, in the white sub-pixel regions W) and a height h2 of the upper surface of the transparent layer 140 in the red, green, and blue sub-pixel regions R, G, and B may decrease, and thus the flatness of the upper surface of the transparent layer 140 may be improved.

Referring to FIG. 1, the disconnected portions 122 are formed in two sides of each of the second openings WOP in a first direction. However, aspects of the inventive concept are not limited thereto. In other embodiments, the disconnected portions 122 may be formed in two sides of each of the second openings WOP in a second direction or may be formed in four sides of each of the second openings WOP in the first and second directions. In other embodiments, the disconnected portions 122 may be formed in corners of each of the second openings WOP in third and fourth directions. The number and positions of disconnected portions 122 may vary depending on factors, such as the areas of the sub-pixel regions R, G, B, and W, the thicknesses of the red, green, and blue color filters 130R, 130G, and 130B, and/or the thickness of the transparent layer 140.

Figure 4:
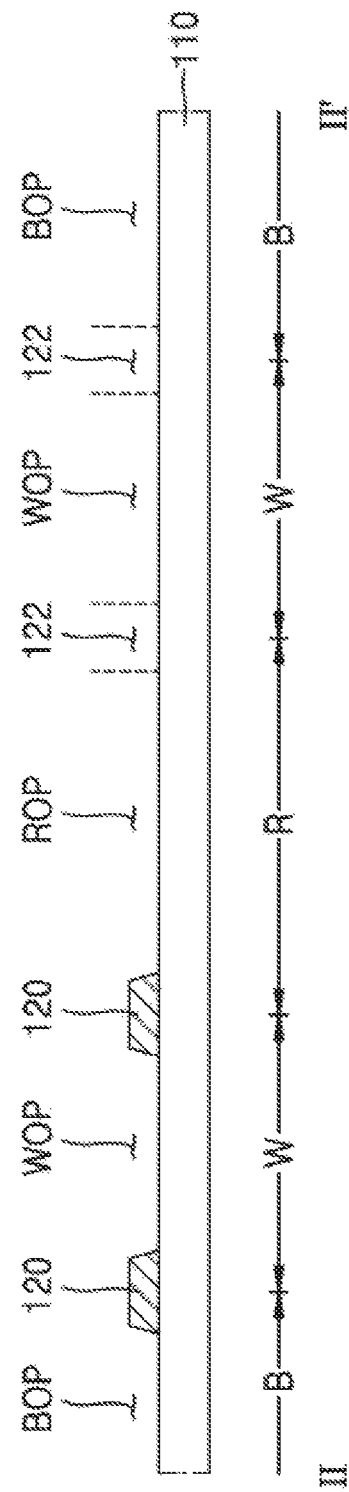
FIG. 4, FIG. 5, and FIG. 6 are cross-sectional views illustrating a method of manufacturing a color filter substrate, according to an exemplary embodiment.
Figure 5:
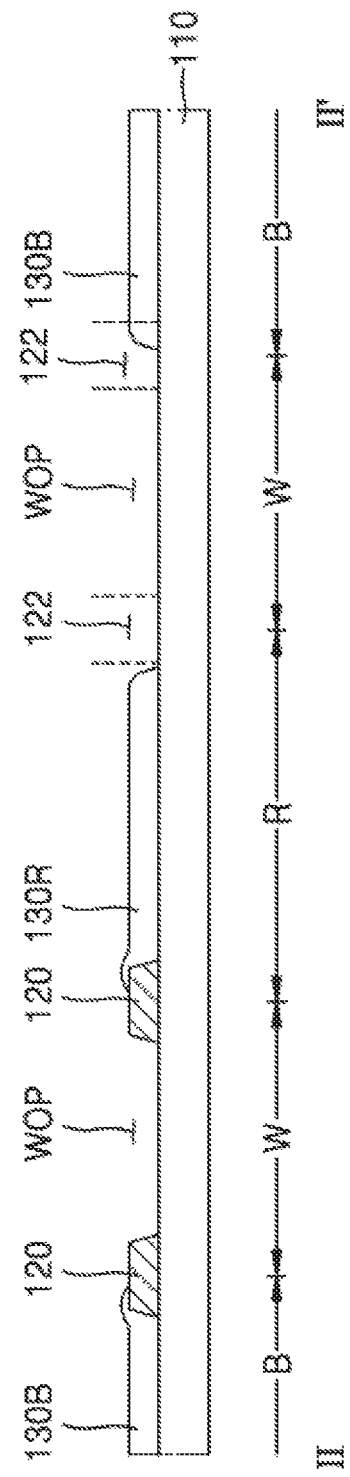
Figure 6:
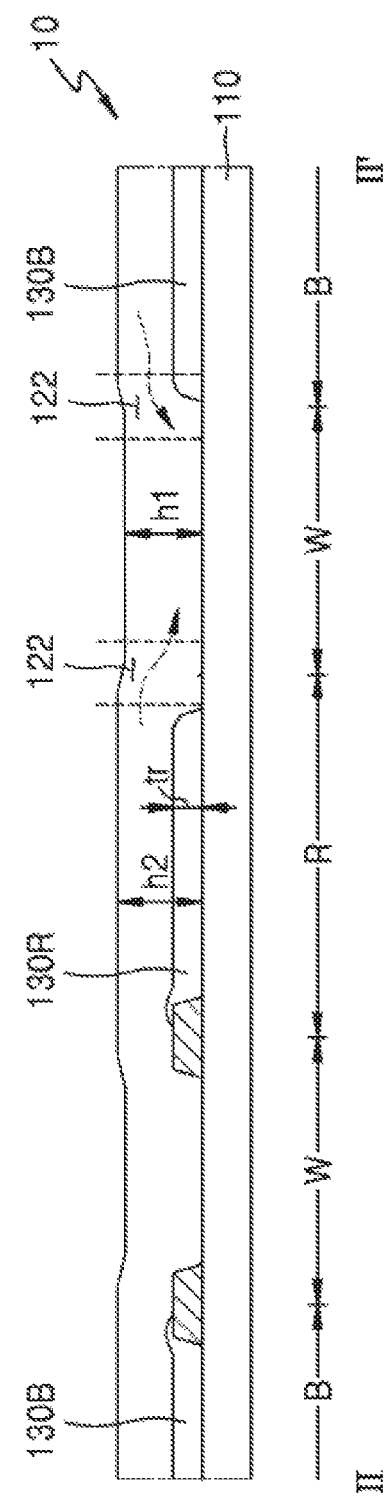

FIG. 4, FIG. 5, and FIG. 6 are cross-sectional views illustrating a method of manufacturing a color filter substrate, according to an exemplary embodiment.

Referring to FIG. 4 and FIG. 1, a first substrate 110 including white, red, green, and blue sub-pixel regions W, R, G, and B is prepared, and a light-blocking pattern 120 is disposed on the first substrate 110. In some embodiments, the light-blocking pattern 120 may be formed by forming a light-blocking layer (not shown) on the first substrate 110, and patterning the light-blocking layer. In some embodiments, the light-blocking pattern 120 may be formed by applying a black photosensitive resin containing a black pigment to the first substrate 110, and patterning the black photosensitive resin using a mask.

The light-blocking pattern 120 may be disposed among the white, red, green, and blue sub-pixel regions W, R, G, and B so as to prevent mixing of colors and increase the degree of contrast by absorbing light incident from the outside. The light-blocking pattern 120 may include disconnected portions 122 and openings WOP, ROP, GOP, and BOP respectively corresponding to the white, red, green, and blue sub-pixel regions W, R, G, and B. For example, the disconnected portions 122 may connect or couple the openings WOP (second openings WOP) corresponding to the white sub-pixel regions W to one or more of the openings ROP, GOP, and BOP (first openings ROP, GOP, and BOP) corresponding to the red, green, and blue sub-pixel regions R, G, B adjacent to the white sub-pixel regions W. For example, the openings BOP, WOP, and ROP in the second row of FIG. 1 are formed as one connected opening by the disconnected portion 122 between the openings BOP and WOP in the second row of FIG. 1 and the disconnected portion 122 between the openings WOP and ROP in the second row of FIG. 1.

Referring to FIG. 5 and FIG. 1, red, green, and blue color filters 130R, 130G, and 130B may be disposed on the first openings ROP, GOP, and BOP corresponding to the red, green, and blue sub-pixel regions R, G, and B, respectively. The red, green, and blue color filters 130R, 130G, and 130B may include materials prepared by adding red, green, and blue pigments or dyes to a transparent resin. The red, green, and blue color filters 130R, 130G, and 130B may be filled in the first openings ROP, GOP, and BOP. The red, green, and blue color filters 130R, 130G, and 130B may be shaped in the form of islands disposed in the red, green, and blue sub-pixel regions R, G, and B. The red, green, and blue color filters 130R, 130G, and 130B may be larger than the openings ROP, GOP, and BOP, respectively, and end portions of the red, green, and blue color filters 130R, 130G, and 130B may be disposed partially on an upper surface of the light-blocking pattern 120. Color filters are not formed in the second openings WOP corresponding to the white sub-pixel regions W.

Referring to FIG. 6 and FIG. 1, a transparent layer 140 may be disposed on the first substrate 110. In some embodiments, the transparent layer 140 may be formed by applying an electrically insulative transparent material such as an acrylic resin or an epoxy-containing resin to the first substrate 110, and hardening the applied transparent material.

In this case, the transparent material for forming the transparent layer 140 may be applied to the entire region of the first substrate 110. The transparent material applied to the first substrate 110 may be a liquid that can flow. The height of the applied transparent material may be greater in the red, green, and blue sub-pixel regions R, G, and B than in the white sub-pixel regions W. In this case, since the transparent material has flowability, the transparent material may easily flow through the disconnected portions 122 to the white sub-pixel regions W, which have relatively lower top surfaces. Since the transparent material flows as described above, the amount of the transparent material in the red, green, and blue sub-pixel regions R, G, and B gradually decreases, and the amount of the transparent material in the white sub-pixel regions W (the second openings WOP) gradually increases. Therefore, the thickness of the transparent material in the red, green, and blue sub-pixel regions R, G, and B gradually decreases, and the thickness of the transparent material in the white sub-pixel regions W gradually increases. Thereafter, the transparent material is hardened into the transparent layer 140, and thus the transparent layer 140 may have a substantially flat upper surface. That is, the difference between a height h1 measured from the first substrate 110 to the upper surface of the transparent layer 140 in the white sub-pixel regions W and a height h2 measured from the first substrate 110 to the upper surface of the transparent layer 140 in the red, green, and blue sub-pixel regions R, G, and B may significantly decrease, and thus the flatness of the upper surface of the transparent layer 140 may be improved.

The transparent layer 140 may cover the red, green, and blue color filters 130R, 130G, and 130B and prevent elution of pigment ions from the red, green, and blue color filters 130R, 130G, and 130B. The transparent layer 140 extends over the white sub-pixel regions W in which color filters are not formed, as well as extending over the red, green, and blue sub-pixel regions R, G, and B. Portions of the transparent layer 140 are filled in the second openings WOP. Since the disconnected portions 122 are used as passages for the flowing transparent material to level the top surface of the transparent material, some of the transparent material remains in the disconnected portions 122. That is, at least some regions of the disconnected portions 122 are filled with the transparent layer 140.

Figure 7:
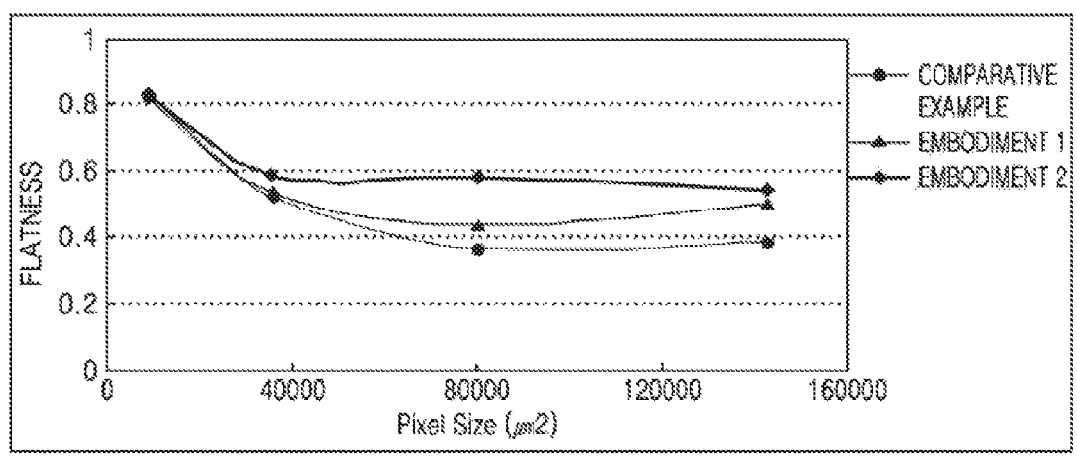
FIG. 7 is a graph showing the flatness of color filter substrates prepared in example embodiments and a comparative example.

FIG. 7 is a graph showing the flatness of color filter substrates prepared in embodiments and a comparative example.

In FIG. 7, the x-axis denotes a sub-pixel region size, and the y-axis denotes flatness. The flatness may be defined by (H2−H1)/(Ho2−Ho1), where H2 refers to the height from a first substrate 110 to the uppermost layer in a red sub-pixel region (or a green or blue sub-pixel region) after a transparent layer 140 is formed; H1 refers to the height from the first substrate 110 to the uppermost layer in a white sub-pixel region after the transparent layer 140 is formed; Ho2 refers to the height from the first substrate 110 to the uppermost layer in the red sub-pixel region (or the green or blue sub-pixel region) before the transparent layer 140 is formed; and Ho1 refers to the height from the first substrate 110 to the uppermost layer in the white sub-pixel region before the transparent layer 140 is formed.

In Embodiments 1 and 2 shown in FIG. 7, color filter substrates such as the color filter substrate 10 shown in FIG. 6 were tested. In Embodiments 1 and 2, H2 may correspond to h2, H1 may correspond to h1, Ho2 may correspond to the thickness tr of a red color filter, and Ho1 may be zero (0). In the color filter substrate tested in Embodiment 1, as shown in FIG. 1, two disconnected portions 122 were formed for a white sub-pixel region W in a first direction so as to connect openings of two neighboring sub-pixel regions to an opening WOP of the white sub-pixel region W. In the color filter substrate tested in Embodiment 2, disconnected portions 122 were formed in four corners of a white sub-pixel region W in third and fourth directions so as to connect openings of four neighboring sub-pixel regions to an opening WOP of the white sub-pixel region W.

In the comparative example, a test was performed on a color filter substrate, which does not include disconnected portions 122 in a light-blocking pattern. That is, in the color filter substrate of the comparative example, each sub-pixel region was completely surrounded by the light-blocking pattern and separated from another sub-pixel region by the light-blocking pattern.

Referring to FIG. 7, the flatness of the color filter substrates of Embodiments 1 and 2 including the disconnected portions 122 is improved by about 0.2, in comparison with the flatness of the color filter substrate of the comparative example, which does not include the disconnected portions 122. The improvement of flatness by about 0.2 indicates that the height difference of a transparent layer 140 is decreased by about 40%.

Figure 8:
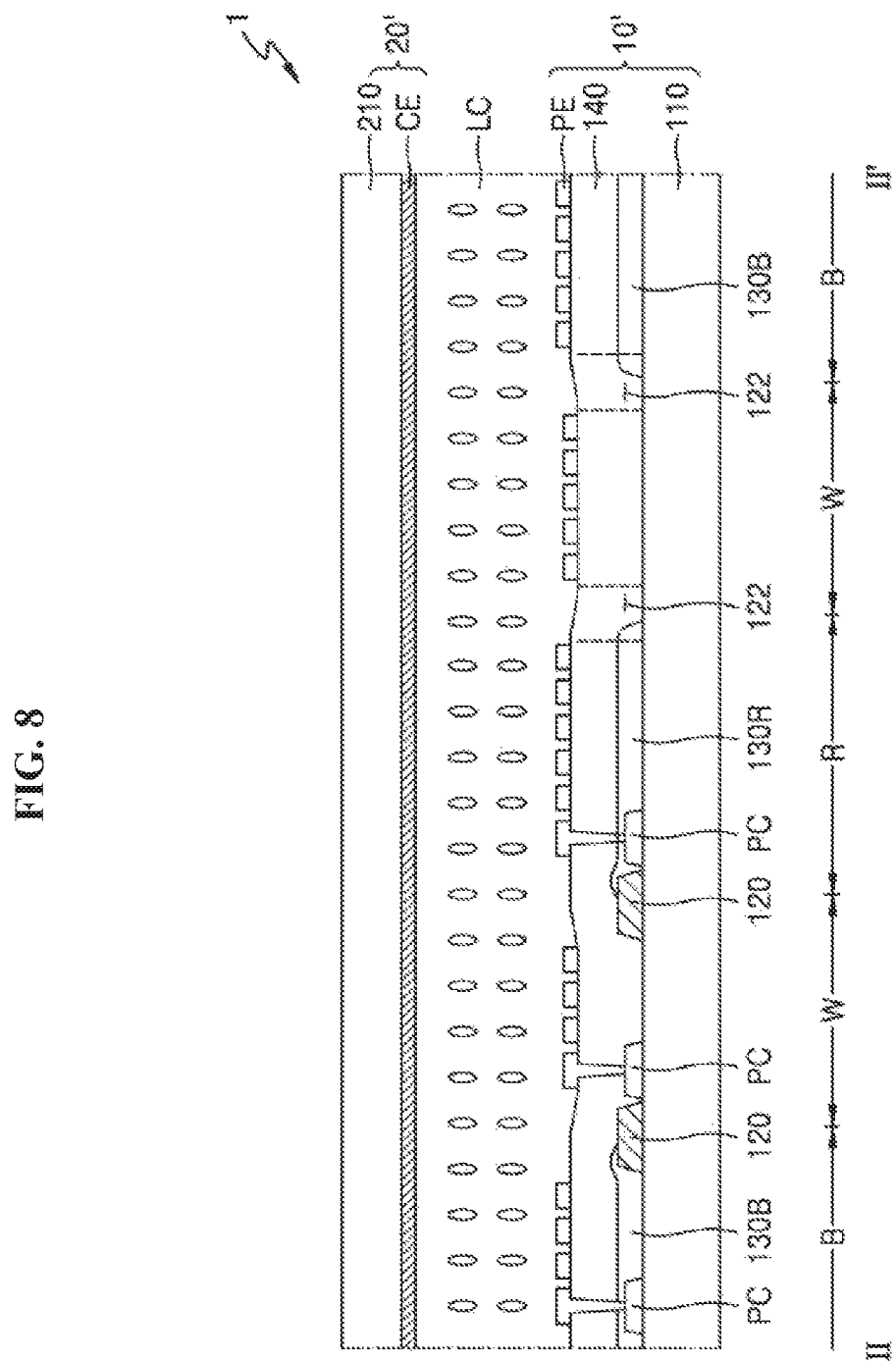
FIG. 8 is a schematic view illustrating an LCD according to an exemplary embodiment.

FIG. 8 is a schematic view illustrating an LCD 1 according to an exemplary embodiment.

Referring to FIG. 8, the LCD 1 may include a color filter substrate 10', an opposite substrate 20', which is opposite the color filter substrate 10' and faces the color filter substrate 10', and a liquid crystal layer LC disposed between the color filter substrate 10' and the opposite substrate 20'.

The color filter substrate 10' includes a structure of the color filter substrate 10 partially similar to the structure described with reference to FIG. 1, FIG. 2, and FIG. 3. In addition, the color filter substrate 10' may further include pixel circuits PC and pixel electrodes PE connected to the pixel circuits PC. The pixel circuits PC may be disposed in red, green, blue, and white sub-pixel regions R, G, B, and W, respectively, and the pixel circuits PC disposed in the red, green, and blue sub-pixel regions R, G, and B may be covered with red, green, and blue color filters 130R, 130G, and 130B. The pixel electrodes PE may be formed on a transparent layer 140 through a patterning process performed on each of the red, green, blue, and white sub-pixel regions R, G, B, and W. The opposite substrate 20' may include a common electrode CE disposed on a second substrate 210 and facing the pixel electrodes PE.

The color filter substrate 10' illustrated in FIG. 8 may be formed by the manufacturing method described with reference to FIG. 4, FIG. 5, and FIG. 6. However, a process of forming the pixel circuits PC may be further performed before forming the red, green, and blue sub-pixel regions R, G, and B. In addition, a process of forming contact holes to expose the pixel circuits PC may be further performed after the transparent layer 140 is disposed, and a process of forming the pixel electrodes PE electrically connected to the pixel circuits PC through the contact holes may further be performed. In some embodiments, the transparent layer 140 may include a transparent photosensitive resin. In this case, the transparent photosensitive resin may flow through disconnected portions 122 (shown in e.g., FIG. 1), and thus the flatness of the transparent layer 140 may be improved as described above.

In FIG. 8, the common electrode CE is formed in the opposite substrate 20', and the pixel electrodes PE are formed in the color filter substrate 10'. However, the inventive concept is not limited thereto. In some embodiments, electrodes other than the pixel electrodes PE and the common electrode CE may be further formed, and all the electrodes may be disposed on the color filter substrate 10' or the opposite substrate 20'. Further, the common electrode CE may be disposed on the color filter substrate 10', and the pixel electrodes PE may be disposed on the opposite substrate 20'. The number and/or arrangement of electrodes may vary depending on the mode of the liquid crystal layer LC.

In the present disclosure, a flat color filter substrate refers to a state or structure in which the light-blocking pattern 120 including the disconnected portions 122; the red, green, and blue color filters 130R, 130G, and 130B; and the transparent layer 140 are disposed on the first substrate 110. In some embodiments, a color filter substrate may refer to a state or structure until the transparent layer 140 is formed on the first substrate 110 as shown in FIG. 1 through FIG. 6. In other embodiments, the flat color filter substrate or the color filter substrate may include elements and layers other than the light-blocking pattern 120, the color filters 130R, 130G, and 130B, and the transparent layer 140. For example, the color filter substrate may further include pixel circuits PC including thin film transistors as shown in FIG. 8.

Figure 9:
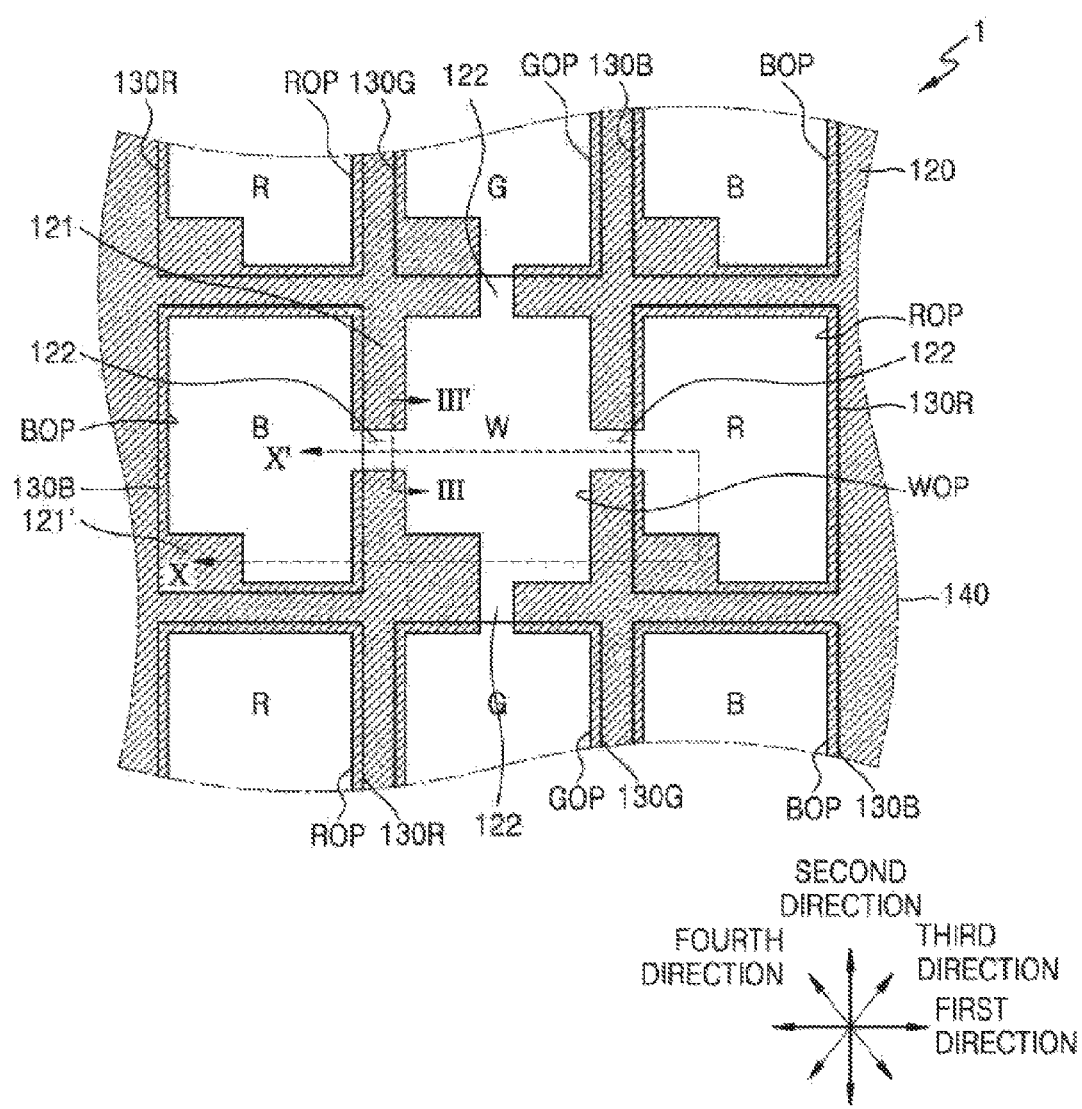
FIG. 9 is a schematic plan view illustrating a liquid crystal display (LCD) according to an exemplary embodiment.

FIG. 9 is a schematic plan view illustrating a liquid crystal display (LCD) 1 according to an exemplary embodiment. FIG. 10 is a cross-sectional view taken along section line X-X' of FIG. 9 according to an exemplary embodiment.

Referring to FIG. 9, the light-blocking pattern 120 may include sub-pixel boundary portions 121, the extended light-blocking patterns 121'. By forming openings on the light-blocking pattern 120, the openings ROP, GOP, BOP, and WOP, and the disconnected portions 122 may be formed. As described above, the sub-pixel boundary portions 121 prevent mixing of colors and absorb light incident from the outside to increase the degree of contrast. The extended light-blocking patterns 121' may serve as a black matrix for covering the pixel circuits PC. One or more sub-pixel boundary portions 121 adjacent to the opening WOP of the white sub-pixel region W may include the disconnected portions 122.

FIG. 9 and FIG. 10 are similar to FIG. 1 and FIG. 2, respectively, except for the positions of extended light-blocking patterns 121' as shown in FIG. 9 and FIG. 10. The extended light-blocking patterns 121' may be formed as a portion of the light-blocking pattern 120 when forming the light-blocking pattern 120. As shown in FIG. 9 and FIG. 10, pixel circuits PC may be covered by the extended light-blocking patterns 121'. Further, as shown in FIG. 9, the disconnected portions 122 may be formed four sides of the white sub-pixel region. However, the disconnected portions 122 may not be formed on a location corresponding to the location in which the printed circuits PC are disposed.

According to one or more exemplary embodiments, a white color filter is provided using the transparent layer, and the flatness of the color filter substrate is improved. In addition, the LCD provides better display quality.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A color filter substrate comprising:
   a first substrate comprising a first sub-pixel region corresponding to a non-white color region and a second sub-pixel region corresponding to a white color region adjacent to the first sub-pixel region;
   a light-blocking pattern disposed on the first substrate, the light-blocking pattern including a first opening corresponding to the first sub-pixel region, a second opening corresponding to the second sub-pixel region, and a sub-pixel boundary portion extending around the entire periphery of the first sub-pixel region except for a disconnected portion between the first sub-pixel region and the second sub-pixel region such that the first and second openings are coupled to each other via the disconnected portion of the sub-pixel boundary portion;
   a first color filter having a first color and disposed in the first sub-pixel region; and
   a transparent layer disposed in the second sub-pixel region and on the first color filter.

2. The color filter substrate of claim 1, wherein the first sub-pixel region comprises at least one selected from red, green, and blue sub-pixel regions.

3. The color filter substrate of claim 2, wherein the second sub-pixel region is surrounded by the red, blue, and green sub-pixel regions.

4. The color filter substrate of claim 1, wherein the transparent layer is electrically insulative.

5. The color filter substrate of claim 1, wherein the disconnected portion is filled with the transparent layer.

6. The color filter substrate of claim 1, wherein the second opening is filled with the transparent layer.

7. The color filter substrate of claim 1, wherein an end portion of the first color filter is disposed on an upper surface of the light-blocking pattern.

8. The color filter substrate of claim 1, wherein the first substrate comprises a third sub-pixel region corresponding to another non-white color region and adjacent to the second sub-pixel region, and
wherein the light-blocking pattern further comprises another disconnected portion between the second sub-pixel region and the third sub-pixel region.

9. A liquid crystal display (LCD) comprising:
a color filter substrate;
an opposite substrate which is opposite the color filter substrate; and
a liquid crystal layer disposed between the color filter substrate and the opposite substrate,
wherein the color filter substrate comprises:
a first substrate comprising a first sub-pixel region corresponding to a non-white color region and a second sub-pixel region corresponding to a white color region adjacent to the first sub-pixel region;
a light-blocking pattern disposed on the first substrate, the light-blocking pattern including a first opening corresponding to the first sub-pixel region, a second opening corresponding to the second sub-pixel region, and a sub-pixel boundary portion extending around the entire periphery of the first sub-pixel region except for a disconnected portion between the first sub-pixel region and the second sub-pixel region such that the first and second openings are coupled to each other via the disconnected portion of the sub-pixel boundary portion;
a first color filter having a first color and disposed in the first sub-pixel region; and
a transparent layer disposed in the second sub-pixel region and on the first color filter.

10. The LCD of claim 9, wherein the first color is one of red, green, and blue.

11. The LCD of claim 9, wherein the transparent layer is electrically insulative.

12. The LCD of claim 9, wherein the second opening is filled with the transparent layer.

13. The LCD of claim 9, wherein the disconnected portion is filled with the transparent layer.

14. A method of manufacturing a color filter substrate, the method comprising:
forming a light-blocking pattern on a first substrate, the light-blocking pattern including a first opening corresponding to a first sub-pixel region, a second opening corresponding to a second sub-pixel region, and a sub-pixel boundary portion extending around the entire periphery of the first sub-pixel region except for a disconnected portion between the first sub-pixel region and the second sub-pixel region such that the first and second openings are coupled to each other via the disconnected portion of the sub-pixel boundary portion, wherein the first sub-pixel region corresponds to a non-white color region and the second sub-pixel region corresponds to a white color region adjacent to the first sub-pixel region;
forming a first color filter in the first sub-pixel region, the first color filter having a first color; and
forming a transparent layer in the second sub-pixel region and on the first color filter.

15. The method of claim 14, wherein the transparent layer is electrically insulative.

16. The method of claim 14, wherein the first sub-pixel region comprises at least one selected from red, green, and blue sub-pixel regions.

17. The method of claim 14, wherein, in the forming of the transparent layer, a portion of the transparent layer fills at least a portion of the disconnected portion.

18. The method of claim 14, wherein, in the forming of the transparent layer, a portion of the transparent layer fills the second opening.

19. The method of claim 14, wherein the second sub-pixel region is surrounded by red, green, and blue sub-pixel regions.

20. The method of claim 14, wherein the light-blocking pattern comprises a third opening corresponding to a third sub-pixel region, the third sub-pixel region corresponding to another non-white color region and adjacent to the second sub-pixel region, and
wherein the light-blocking pattern further comprises another disconnected portion between the second sub-pixel region and the third sub-pixel region.

* * * * *